United States Patent
Tsai et al.

(10) Patent No.: US 9,729,897 B2
(45) Date of Patent: *Aug. 8, 2017

(54) MOTION PREDICTION METHOD

(71) Applicant: HFI INNOVATION INC., Zhubei (TW)

(72) Inventors: Yu-Pao Tsai, Fongshan (TW);
Chih-Ming Fu, Hsinchu (TW);
Jian-Liang Lin, Su'ao Township (TW);
Yu-Wen Huang, Taipei (TW);
Shaw-Min Lei, New Taipei (TW)

(73) Assignee: HFI INNOVATION INC., Zhubei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,173

(22) Filed: Apr. 16, 2015

(65) Prior Publication Data

US 2015/0222922 A1 Aug. 6, 2015

Related U.S. Application Data

(63) Continuation of application No. 12/957,644, filed on Dec. 1, 2010, now Pat. No. 9,036,692.

(Continued)

(51) Int. Cl.
*H04N 19/172* (2014.01)
*H04N 19/513* (2014.01)
*H04N 19/56* (2014.01)

(52) U.S. Cl.
CPC .......... *H04N 19/56* (2014.11); *H04N 19/172* (2014.11); *H04N 19/513* (2014.11)

(58) Field of Classification Search
None
See application file for complete search history.

(56) References Cited

U.S. PATENT DOCUMENTS 6,005,980 A    12/1999  Eifrig et al.
RE38,564 E *    8/2004  Eifrig .................. H04N 19/563
                                                 348/578

(Continued)

FOREIGN PATENT DOCUMENTS

CN    1226781    8/1999
CN    1471320    1/2004

(Continued)

OTHER PUBLICATIONS

Laroche, G., et al.; "RD Optimized Coding for Motion Vector Predictor Selection;" IEEE Transactions on Circuits and Systems for Video Technology; vol. 18; No. 9; Sep. 2008; pp. 1247-1257.

(Continued)

*Primary Examiner* — Reza Aghevli
(74) *Attorney, Agent, or Firm* — Oblon, McClelland, Maier & Neustadt, L.L.P.

(57) ABSTRACT

The invention provides a motion prediction method. First, a plurality of candidate units corresponding to a current unit of a current frame is determined. A plurality of motion vectors of the candidate units is then obtained. A plurality of scaling factors of the candidate units is then calculated according to a plurality of respective temporal distances depending on a plurality of reference frames of the motion vectors. The motion vectors of the candidate units are then scaled according to the scaling factors to obtain a plurality of scaled motion vectors. The scaled motion vectors are ranked, and a subset of highest ranking motion vectors are identified to be included in a candidate set. Finally, a motion vector predictor for motion prediction of the current unit is then selected from the candidate units.

20 Claims, 8 Drawing Sheets

Related U.S. Application Data

(60) Provisional application No. 61/326,731, filed on Apr. 22, 2010, provisional application No. 61/295,810, filed on Jan. 18, 2010.

(56) References Cited

U.S. PATENT DOCUMENTS

| | | |
|---|---|---|
| 7,310,373 B2 | 12/2007 | Kondo et al. |
| 7,889,792 B2 | 2/2011 | Dumitras et al. |
| 8,155,193 B2 | 4/2012 | Kato et al. |
| 2004/0057520 A1 | 3/2004 | Sun |
| 2005/0013365 A1* | 1/2005 | Mukerjee ............... H04N 19/56 375/240.16 |
| 2005/0031037 A1 | 2/2005 | Carrasco et al. |
| 2005/0053137 A1 | 3/2005 | Holcomb |
| 2005/0147167 A1* | 7/2005 | Dumitras ............. H04N 19/139 375/240.16 |
| 2005/0226335 A1* | 10/2005 | Lee ........................ H04N 19/56 375/240.16 |
| 2006/0018381 A1* | 1/2006 | Luo ........................ H04N 5/145 375/240.16 |
| 2007/0014358 A1* | 1/2007 | Tourapis ................ H04N 19/56 375/240.15 |
| 2008/0069232 A1* | 3/2008 | Kondo ................. H04N 19/105 375/240.16 |
| 2008/0285653 A1 | 11/2008 | Chang |
| 2009/0034854 A1* | 2/2009 | Lee ..................... H04N 19/105 382/236 |
| 2009/0067501 A1 | 3/2009 | Boon et al. |
| 2009/0067502 A1 | 3/2009 | Jeon et al. |
| 2009/0097560 A1* | 4/2009 | Robertson ............ H04N 19/176 375/240.16 |
| 2011/0103486 A1 | 5/2011 | Sato et al. |
| 2013/0148737 A1 | 6/2013 | Tourapis et al. |
| 2015/0110194 A1 | 4/2015 | Kato et al. |

FOREIGN PATENT DOCUMENTS

| | | |
|---|---|---|
| CN | 1523896 | 8/2004 |
| CN | 1592421 | 3/2005 |
| CN | 101309407 | 11/2008 |
| EP | 1 482 742 | 12/2004 |
| JP | 2004-208258 | 7/2004 |
| JP | 2004336369 | 11/2004 |
| JP | 2010016453 | 1/2010 |

OTHER PUBLICATIONS

International Search Report dated Jul. 14, 2011.

Jung, J., et al.; "Competition-Based Scheme for Motion Vector Selection and Coding;" ITU-Telecommunications Standardization Sector Study Group; Jul. 2006; pp. 1-8.

"Unification of Motion Vector Prediction Methods;" Joint Video Team (JVT) of ISO/IEC MPEG & ITU-T VCEG; Oct. 2002; pp. 1-12.

Ahmed, et al.; "A Fast Adaptive Motion Estimation Algorithm;" IEEE Trans. on Circuits and Systems for Video Technology; vol. 16; No. 3; Mar. 2006; pp. 420-438.

* cited by examiner

| Motion difference value \ Coded unit / Candidate unit | A | B | C | D | a | b | --- | i | j |
|---|---|---|---|---|---|---|---|---|---|
| A | $D_{A,A}$ | $D_{B,A}$ | $D_{C,A}$ | $D_{D,A}$ | $D_{a,A}$ | $D_{b,A}$ | --- | $D_{i,A}$ | $D_{j,A}$ |
| B | $D_{A,B}$ | $D_{B,B}$ | $D_{C,B}$ | $D_{D,B}$ | $D_{a,B}$ | $D_{b,B}$ | --- | $D_{i,B}$ | $D_{j,B}$ |
| C | $D_{A,C}$ | $D_{B,C}$ | $D_{C,C}$ | $D_{D,C}$ | $D_{a,C}$ | $D_{b,C}$ | --- | $D_{i,C}$ | $D_{j,C}$ |
| D | $D_{A,D}$ | $D_{B,D}$ | $D_{C,D}$ | $D_{D,D}$ | $D_{a,D}$ | $D_{b,D}$ | --- | $D_{i,D}$ | $D_{j,D}$ |
| e | $D_{A,e}$ | $D_{B,e}$ | $D_{C,e}$ | $D_{D,e}$ | $D_{a,e}$ | $D_{b,e}$ | --- | $D_{i,e}$ | $D_{j,e}$ |
| Weighted Sum | $S_A$ | $S_B$ | $S_C$ | $S_D$ | $S_a$ | $S_b$ | --- | $S_i$ | $S_j$ |

FIG. 7

MOTION PREDICTION METHOD

CROSS REFERENCE TO RELATED APPLICATIONS

The present application is a Continuation Application of U.S. patent application Ser. No. 12/957,644 filed on Dec. 1, 2010, now U.S. Pat. No. 9,036,692, which claims the benefit of U.S. Provisional Application No. 61/295,810, filed on Jan. 18, 2010, and U.S. Provisional Application No. 61/326,731, filed on Apr. 22, 2010, the entirety of which are incorporated by reference herein.

BACKGROUND OF THE INVENTION

Field of the Invention

The invention relates to video processing, and more particularly to motion prediction of video data.

Description of the Related Art

The new upcoming H.264 compression standard can provide good video quality at substantially lower bit rates than previous standards by adopting features such as sub-pixel accuracy and multiple-referencing. The video compression process can be generally divided into 5 parts which include: inter-prediction/intra-prediction, transform/inverse-transform, quantization/inverse-quantization, loop filter, and entropy encoding. H.264 is used in various applications such as Blu-ray Discs, DVB broadcasting services, direct-broadcast satellite television service, cable television services, and real-time videoconferencing.

A video datastream comprises a series of frames. Each frame is divided into a plurality of coding units (e.g. macroblocks or extended macroblocks) for video processing. Each coding unit can be segmented into quad-tree partitions, and a leaf coding unit is called a prediction unit. A prediction unit can be further segmented into quad-tree partitions, and each partition is assigned with a motion parameter. In order to reduce the cost of transmitting enormous amount of motion parameters, a motion vector predictor (MVP) is calculated for each partition by referencing to adjacent coded blocks, coding efficiency can thus be improved as the motion of the adjacent blocks tends to have high spatial correlation.

Referring to FIG. 1, a schematic diagram of a current unit 100 and a plurality of neighboring units A, B, C, and D are shown. In this example, both the current unit 100 and neighboring units A, B, C and D are the same size; however, these units are not necessary to be the same size. The motion vector predictor (MVP) of the current unit 100 is predicted according to the motion vectors of the neighboring units A, B, and C, or A, B, and D if C is unavailable. When the current unit 100 is a 16×16 block and a motion vector of the neighboring unit C exists, a medium of the motion vectors of the neighboring units A, B, and C is determined to be the MVP of the current unit 100. When the current unit 100 is a 16×16 block and a motion vector of the neighboring unit C does not exist, a medium of the motion vectors of the neighboring units A, B, and D is determined to be the MVP of the current unit 100. When the current unit 100 is an 8×16 partition in a left half of a 16×16 block, a motion vector of the neighboring unit A is determined to be the MVP of the current unit 100. When the current unit 100 is an 8×16 partition in a right half of a 16×16 block, a motion vector of the neighboring unit C is determined to be the MVP of the current unit 100. When the current unit 100 is a 16×8 partition in an upper half of a 16×16 block, a motion vector of the neighboring unit B is determined to be the MVP of the current unit 100. When the current unit 100 is a 16×8 partition in a lower half of a 16×16 block, a motion vector of the neighboring unit A is determined to be the MVP of the current unit 100.

When an MVP of a current unit is predicted according to the motion vectors of the neighboring units A, B, C, and D, the motion vectors of the neighboring units A, B, C, and D are not properly temporal scaled. For example, the reference frame of the neighboring units A, B, and C are different, and the motion vectors of the neighboring units A, B, and C correspond to the reference frames respectively. The temporal distances between each of the reference frames and the current frame are different. The motion vectors of the neighboring units A, B, and C should therefore be temporal scaled according to the temporal distances before predicting the MVP of the current unit 100 according to the motion vectors of the neighboring units A, B, and C.

The MVP of the current unit 100 is only predicted according to the motion vectors of the neighboring units A, B, C, and D. The prediction accuracy of MVP may be further improved if more candidate MVPs are considered and the best out of the candidate MVPs is selected by rate-distortion optimization. For example, motion vector competition (MVC) is proposed to select the best MVP from a predefined candidate set specified in sequence level. The predefined candidate set may include the H.264 standard predictor (e.g. the median MV of neighboring units), MV of the collocated unit at the same location in a reference frame as that of the current unit, and MVs of the neighboring units. The recommended number of MVPs in the predefined candidate set is two. The predefined candidate set, according to the motion vector competition method, is fixed in a video sequence level.

BRIEF SUMMARY OF THE INVENTION

The invention provides a motion prediction method. First, a plurality of candidate units corresponding to a current unit of a current frame is determined wherein the candidate units comprise at least a neighboring unit of the current unit and at least a reference unit related to a collocated unit of the current unit. A plurality of motion vectors of the candidate units is then obtained. A plurality of scaling factors of the candidate units is then calculated according to a plurality of respective temporal distances depending on a plurality of reference frames of the motion vectors. The motion vectors of the candidate units are then scaled according to the scaling factors to obtain a plurality of scaled motion vectors. The scaled motion vectors are ranked, and a subset of highest ranking motion vectors are identified to be included in a candidate set. Finally, a motion vector predictor for motion prediction of the current unit is then selected from the candidate units.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 7 is a schematic diagram of a table recording motion difference values corresponding to different coded units and candidate units according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
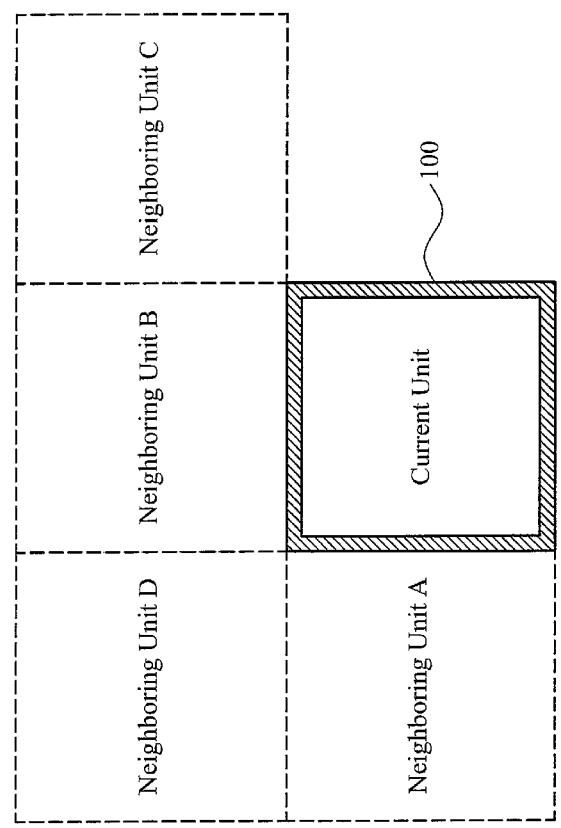
FIG. 1 is a schematic diagram of a current coding unit and a plurality of neighboring coding units.
Figure 2:
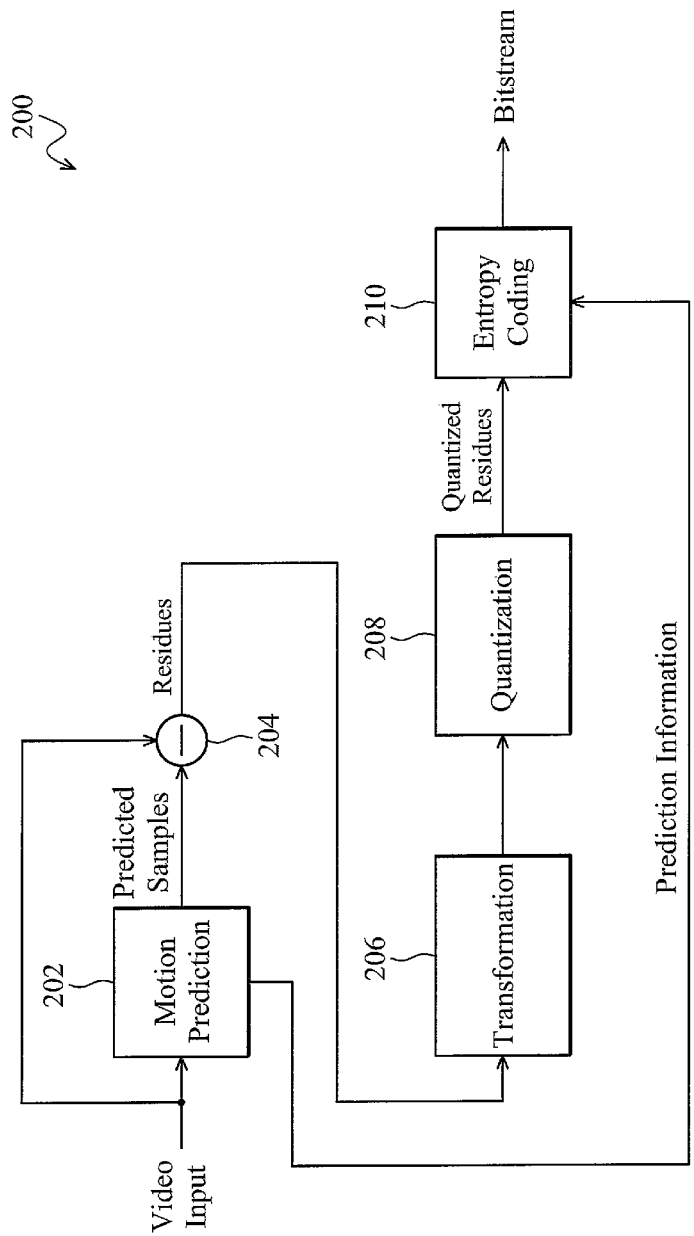
FIG. 2 is a block diagram of a video encoder according to the invention.

Referring to FIG. 2, a block diagram of a video encoder 200 is shown. In one embodiment, the video encoder 200 comprises a motion prediction module 202, a subtraction module 204, a transform module 206, a quantization module 208, and an entropy coding module 210. The video encoder 200 receives a video input and generates a bitstream as an output. The motion prediction module 202 performs motion prediction on the video input to generate predicted samples and prediction information. The subtraction module 204 then subtracts the predicted samples from the video input to obtain residues, thereby reducing video data amount from that of the video input to that of the residues. The residues are then sequentially sent to the transform module 206 and the quantization module 208. The transform module 206 performs a discrete cosine transform (DCT) on the residues to obtain transformed residues. The quantization module 208 then quantizes the transformed residues to obtain quantized residues. The entropy coding module 210 then performs entropy coding on the quantized residues and prediction information to obtain a bitstream as a video output.

Figure 3:
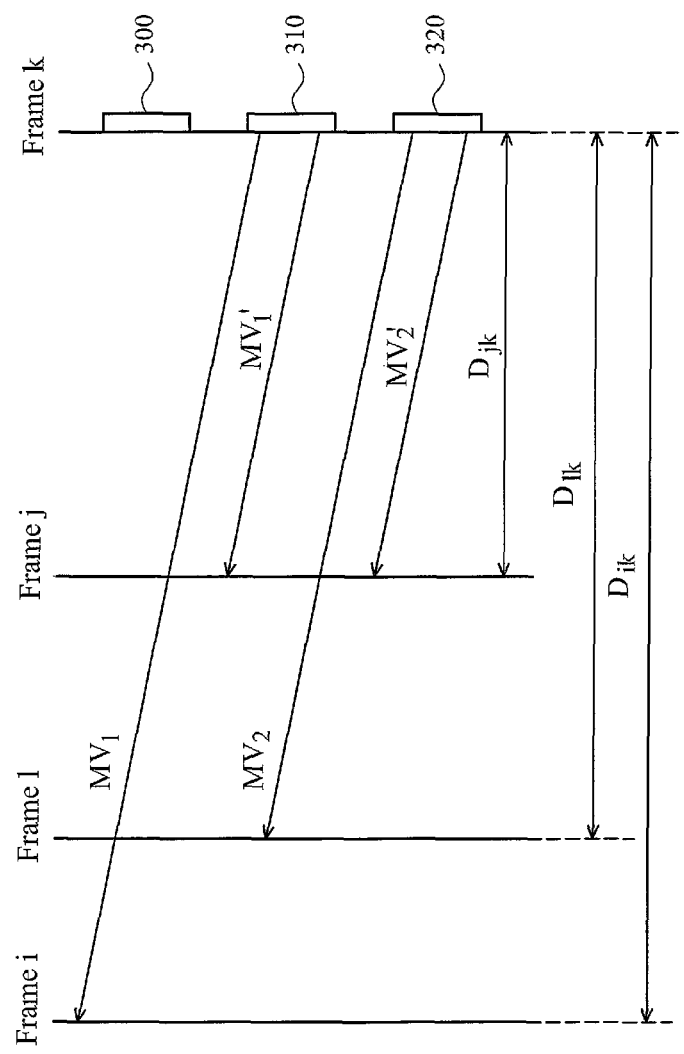
FIG. 3 is a schematic diagram of scaling of a motion vector of two candidate units.

A motion prediction module 202 predicts a motion vector predictor (MVP) of a current unit of a current frame according to motion vectors of a plurality of candidate units. In one embodiment, the candidate units are neighboring units neighboring to the current unit. Before the motion prediction module 202 predicts the MVP of the current unit, temporal distances between reference frames of the candidate units and a current frame are calculated, and the motion vectors of the candidate units are scaled according to the temporal distances. Referring to FIG. 3, a schematic diagram of scaling of a motion vector of two candidate units 310 and 320 is shown. A current frame k comprises two candidate units 310 and 320 for motion prediction of a current unit 300. The first candidate unit 310 has a motion vector $MV_1$ in reference to a reference frame i, and a first temporal difference $D_{ik}$ between the reference frame i and the current frame k is calculated. The second candidate unit 320 has a motion vector $MV_2$ in reference to a reference frame l, and a second temporal difference $D_{lk}$ between the reference frame l and the current frame k is calculated.

A target temporal distance $D_{jk}$ between a target searching frame j and the current frame k is then calculated. The target searching frame j is the selected reference frame. A first temporal scaling factor is then calculated by dividing the target temporal distance $D_{jk}$ by the first temporal distance $D_{ik}$, and the motion vector $MV_1$ of the first candidate unit 310 is multiplied by the first temporal scaling factor ($D_{jk}/D_{ik}$) to obtain a scaled motion vector $MV_1'$ corresponding to the first candidate unit 310. A second temporal scaling factor is then calculated by dividing the target temporal distance $D_{jk}$ by the second temporal distance $D_{lk}$, and the motion vector $MV_2$ of the second candidate unit 320 is multiplied by the second temporal scaling factor ($D_{jk}/D_{lk}$) to obtain a scaled motion vector $MV_2'$ corresponding to the second candidate unit 320. Thus, the scaled motion vectors $MV_1'$ and $MV_2'$ are both measured in reference to the target searching frame j, and the temporal distance difference factor is therefore removed from the scaled motion vectors $MV_1'$ and $MV_2'$. The motion prediction module 202 can then predict the MVP of the current unit 300 according to the scaled motion vectors $MV_1'$ and $MV_2'$ of the candidate units 310 and 320.

Figure 4:
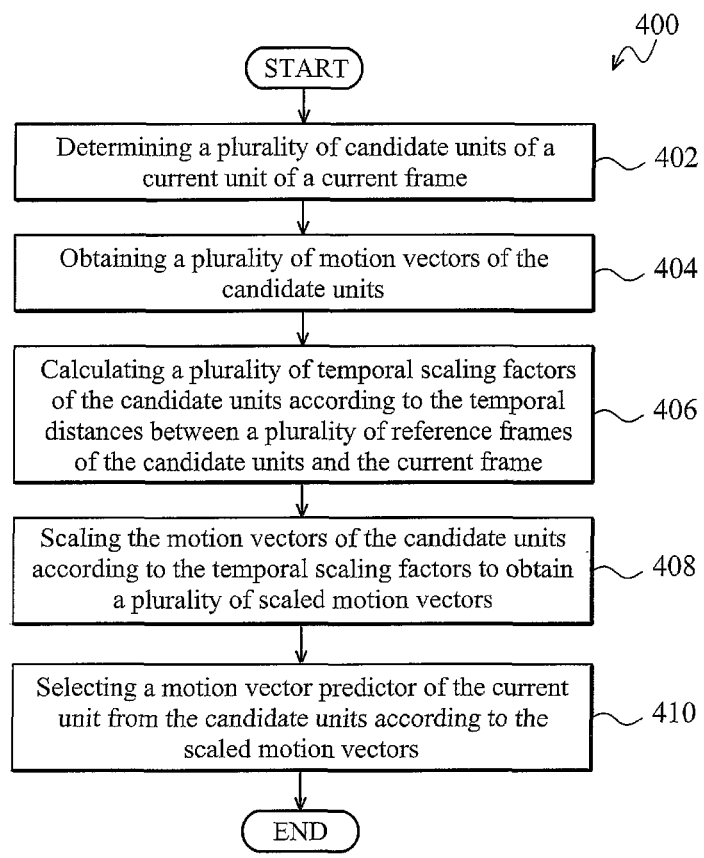
FIG. 4 is a flowchart of a motion prediction method with temporal difference adjustment.

Referring to FIG. 4, a flowchart of a motion prediction method 400 with temporal difference adjustment is shown. First, a plurality of candidate units for motion prediction of a current unit of a current frame is determined (step 402). The candidate units and the current unit are blocks with same or different sizes, and each of these units can be a coding unit, a prediction unit, or a prediction unit partition. In one embodiment, the candidate units comprise a left unit A on the left side of the current unit, an upper unit B on an upper side of the current unit, an upper-right unit C in line with an upper-right direction of the current unit, and an upper-left unit D in line with an upper-left direction of the current unit. A plurality of motion vectors of the candidate units are then obtained (step 404). A plurality of temporal scaling factors of the candidate units is then calculated according to the temporal distances between reference frames of the candidate units and the current frame (step 406). In one embodiment, a plurality of temporal distances between the reference frames of the candidate units and the current frame is first calculated, a target temporal distance between a target searching frame and the current frame is also calculated, and the target temporal distance is then respectively divided by the temporal distances corresponding to the candidate units to obtain a plurality of temporal scaling factors corresponding to the candidate units, as shown in FIG. 3.

The motion vectors of the candidate units are then scaled according to the temporal scaling factors to obtain a plurality of scaled motion vectors (step 408). In one embodiment, the motion vectors of the candidate units are respectively multiplied by the temporal scaling factors of the candidate units to obtain the scaled motion vectors of the candidate units, as shown in FIG. 3. A motion vector predictor of the current unit is then selected from the candidate units according to the scaled motion vectors (step 410). In one embodiment, the scaled motion vectors are sorted, and a medium scaled motion vector is then selected from the scaled motion vectors as the MVP of the current unit.

When the motion prediction module 202 determines a MVP of a current unit according to a motion vector competition method, typically, only motion vectors of two candidate units determined in a sequence level are included in the candidate set for determining MVP of the current unit. In addition, the candidate set is not adaptively determined according to characteristics of the current unit. The performance of motion prediction may be improved if the candidate set is adaptively determined according to characteristics of the current unit.

Figure 5:
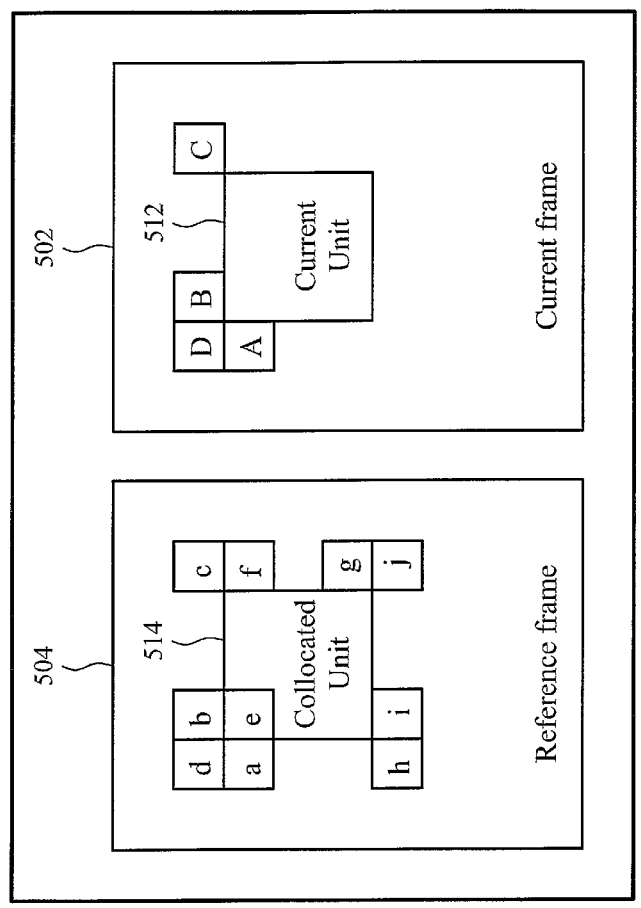
FIG. 5 is a schematic diagram of a plurality of candidate units for motion prediction of a current unit according to an embodiment of the invention.

Referring to FIG. 5, a schematic diagram of a plurality of candidate units for motion prediction of a current unit 512 according to an embodiment of the invention is shown. In this embodiment, the current unit 512 and the candidate units are blocks with different sizes, for example, the current unit 512 is a 16×16 block and the candidate units are 4×4 blocks. In another embodiment, the size of current and candidate units can be the same or different, the size can be 4×4, 8×8, 8×16, 16×8, 16×16, 32×32, or 64×64. In this embodiment, motion vectors of four candidate units A, B, C, and D of the current frame 502 can be taken as candidates for determining the MVP of the current unit 512. In addition, a collocated unit 514 has the same location in a reference frame 504 as that of the current unit 512 in the current frame 502, and the motion vectors of a plurality of candidate units a~j neighboring to the collocated unit 514 or within the collocated unit 514 can also be taken as candidates for determining the MVP of the current unit 512.

The candidate unit A in the current frame 502 is a partition on a left side of the current unit 512, the candidate unit B in the current frame 502 is a partition on an upper side of the current unit 512, the candidate unit C in the current frame 502 is a partition in line with an upper-right direction of the current unit 512, and the candidate unit D in the current frame 502 is a partition in line with an upper-left direction of the current unit 512. The candidate unit a in the reference frame 504 is a partition on a left side of the collocated unit 514, the candidate unit b in the reference frame 504 is a partition on an upper side of the collocated unit 514, the candidate unit c in the reference frame 504 is a partition in line with an upper-right direction of the collocated unit 514, and the candidate unit d in the reference frame 504 is a partition in line with an upper-left direction of the collocated unit 514. In addition, the candidate unit e in the reference frame 504 is a partition inside the collocated unit 514, the candidate units f and g in the reference frame 504 are partitions on a right side of the collocated unit 514, the candidate unit h in the reference frame 504 is a partition in line with a down-left direction of the collocated unit 514, the candidate unit i in the reference frame 504 is a partition on a down side of the collocated unit 514, and the candidate unit j in the reference frame 504 is a partition in line with a down-right direction of the collocated unit 514. In one embodiment, the candidate set for determining the MVP of the current unit 512 further comprises calculated motion vectors, for example, a motion vector equal to a medium of the motion vectors of the candidate units A, B, and C, a motion vector equal to a medium of the motion vectors of the candidate units A, B, and D, and a scaled MVP derived by a method similar to FIG. 4.

Figure 6A:
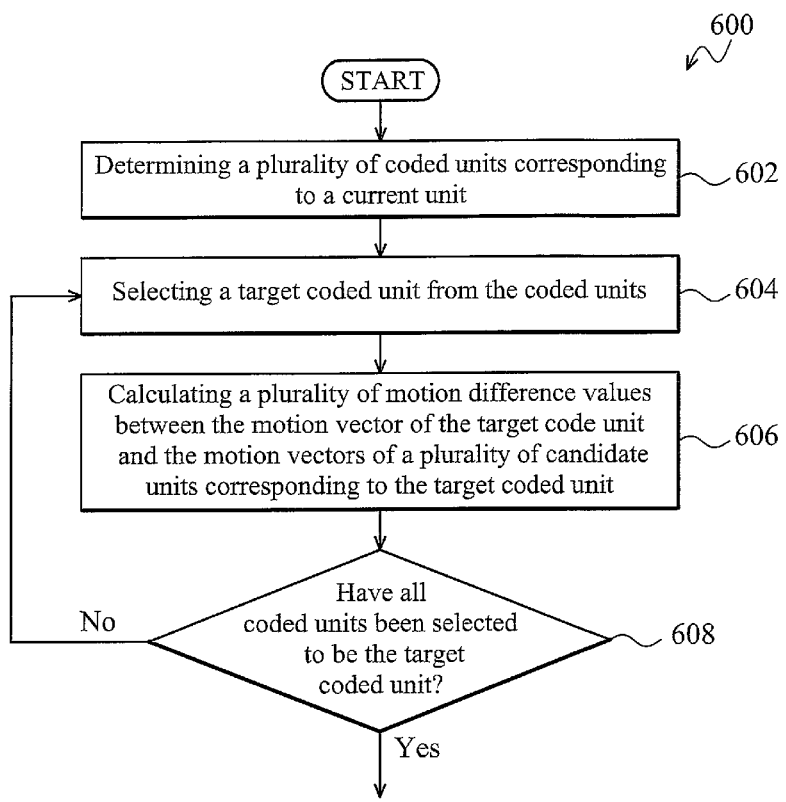
FIGS. 6A and 6B illustrate a flowchart of a motion prediction method with adaptively chosen candidate units according to an embodiment of the invention.
Figure 6A:
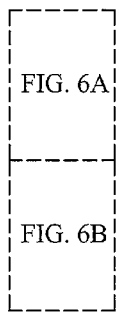
Figure 6B:
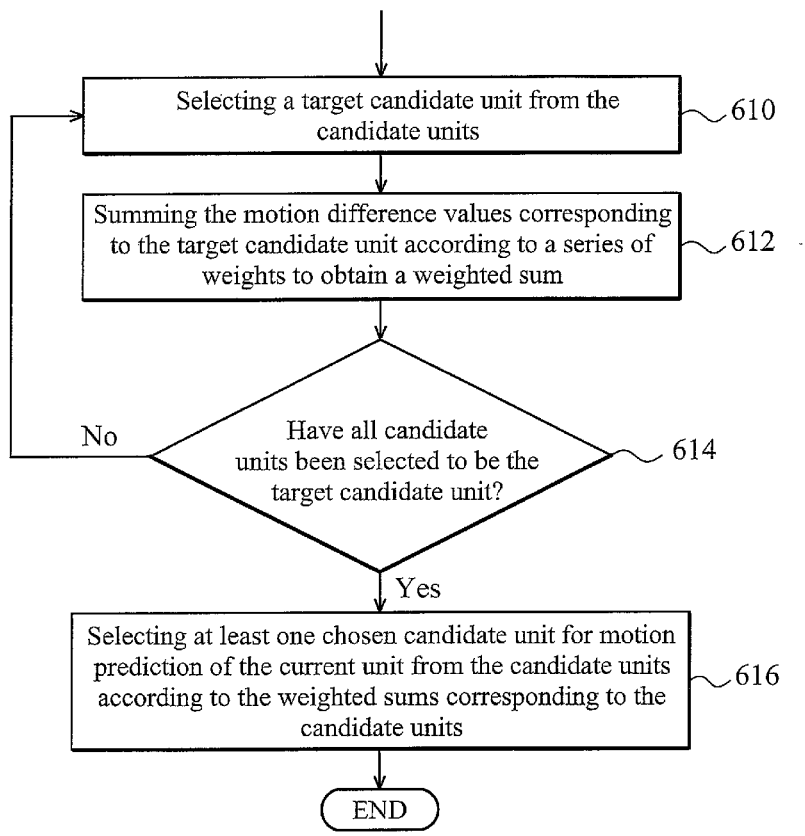

After a plurality of motion vectors corresponding to a current unit 512 is determined to be included in the candidate set, at least one motion vector is adaptively selected from the candidate set for motion prediction of the current unit 512. Referring to FIG. 6, a flowchart of a motion prediction method 600 with adaptively determination of a candidate set is shown. The candidate set for a current unit 512 is selected from a plurality of motion vectors corresponding to the current unit 512 (step 602). The motion vectors may comprise one or a combination of motion vectors of coded partitions/blocks in the same frame, calculated motion vectors, and motion vectors in the reference frame(s). In one embodiment, the candidate set corresponding to the current unit 512 shown in FIG. 5 comprises motion vectors of the units A, B, C, and D in the current frame 502 and a motion vector of the unit e in the reference frame 504. The candidate set may be determined according to one or more of the previous statistics, neighboring information, shape of the current unit, and position of the current unit. For example, the plurality of motion vectors corresponding to the current unit 512 is ranked according to neighboring information, and the first three motion vectors are selected to be included in the candidate set. A final MVP can be selected from the candidate set by the motion vector competition method or by some other selection methods. In some embodiments, the plurality of motion vectors is ranked according to a selection order, and the selection order is determined by weighting sum of motion differences. The motion differences are calculated between each of the motion vector predictors and corresponding decoded motion vectors (i.e. real motion vectors) of the candidate units. The weights can be determined by the shape and position of the current unit, or the weights can be determined by the shape and position of the neighboring blocks.

Referring to FIG. 7, a schematic diagram of a table recording motion difference values corresponding to different coded units and candidate units according to the invention are shown. For example, assume that the unit A is selected to be the target coded unit. A motion difference value $D_{A,A}$ between the motion vectors of the unit A and a candidate unit $A_A$ on a left side of the unit A is calculated. A motion difference value $D_{B,A}$ between the motion vectors of the unit A and a candidate unit $B_A$ on an upper side of the unit A is also calculated. A motion difference value $D_{C,A}$ between the motion vectors of the unit A and a candidate unit $C_A$ in line with an upper-right direction of the unit A is also calculated. A motion difference value $D_{D,A}$ between the motion vectors of the unit A and a candidate unit $D_A$ in line with an upper-left direction of the unit A is also calculated. A motion difference value $D_{a,A}$ between the motion vectors of the unit A and a candidate unit $a_A$ on a left side of a collocated unit corresponding to the unit A is also calculated. Similarly, the motion difference values $D_{b,A}, \ldots, D_{j,A}$ corresponding to the coded unit A are also calculated. The calculated motion difference values $D_{A,A}, D_{B,A}, D_{C,A}, D_{D,A}, D_{a,A}, D_{b,A}, \ldots, D_{j,A}$ corresponding to the target coded unit A are then recorded in the table of FIG. 7. Another target coded unit B is then selected from the coded units (step 604), and the motion difference values $D_{A,B}, D_{B,B}, D_{C,B}, D_{D,B}, D_{a,B}, D_{b,B}, \ldots, D_{j,B}$ corresponding to the target coded unit B are then calculated and recorded in the table of FIG. 7 (step 606). The steps 604 and 606 are repeated until the all coded units A, B, C, D, and e have been selected to be the target coded unit and the motion difference values corresponding to the coded units A, B, C, D, and e have been calculated (step 608).

After all motion differences corresponding to the coded units A, B, C, D, and e have been calculated, a selection order of the plurality of motion vectors are determined by weighting sum of the motion differences (step 610). For example, if the candidate unit A is selected as the target candidate unit, the motion difference values $D_{A,A}, D_{A,B}, D_{A,C}, D_{A,D}$, and $D_{A,e}$ corresponding to the target candidate unit A are then summed according to a series of weights $W_A, W_B, W_C, W_D$, and $W_e$ to obtain a weighted sum $S_A = [(D_{A,A} \times W_A) + (D_{A,B} \times W_B) + (D_{A,C} \times W_C) + (D_{A,D} \times W_D) + (D_{A,e} \times W_e)]$ corresponding to the target candidate unit A, wherein the weights $W_A, W_B, W_C, W_D$, and $W_e$ respectively correspond to one of the coded units A, B, C, D, and e. The other candidate units B, C, D, e, . . . , i, and j are then sequentially selected to be the target candidate unit, and the weighted sums $S_B, S_C, S_D, S_e, \ldots, S_i$, and $S_j$ corresponding to the candidate units B, C, D, e, . . . , i, and j are then sequentially calculated (steps 610 and 612).

When all candidate units have been selected to be the target candidate unit and the weighted sums $S_A, S_B, S_C, S_D$, $S_e, \ldots, S_i$, and $S_j$ corresponding to all the candidate units A, B, C, D, e, ..., i, and j have been calculated (step 614), at least one chosen candidate unit for motion prediction of the current unit is selected from the candidate units A, B, C, D, e, ..., i, and j according to the weighted sums $S_A$, $S_B$, $S_C$, $S_D$, $S_e$, ..., $S_i$, and $S_j$ corresponding to the candidate units A, B, C, D, e, ..., i, and j (step 616). In one embodiment, the weighted sums $S_A$, $S_B$, $S_C$, $S_D$, $S_e$, ..., $S_i$, and $S_j$ are sorted according to the sizes thereof, and the candidate unit corresponding to the smallest weighted sum is determined to be the chosen candidate unit. Finally, a motion vector of the current unit 512 is predicted according to the motion vector of the chosen candidate unit.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A motion prediction method, comprising:
    determining a plurality of candidate units corresponding to a current unit of a current frame, wherein the candidate units comprise at least a neighboring unit of the current unit and at least a reference unit related to a collocated unit of the current unit, wherein the reference unit related to the collocated unit comprises a unit in line with a down-right direction of the collocated unit;
    obtaining a plurality of motion vectors of the candidate units;
    calculating a plurality of scaling factors of the candidate units according to a plurality of respective temporal distances depending on a plurality of reference frames of the motion vectors;
    scaling the motion vectors of the candidate units according to the scaling factors to obtain a plurality of scaled motion vectors;
    ranking the scaled motion vectors;
    identifying a subset of highest ranking motion vectors among the plurality of scaled motion vectors to be included in a candidate set; and
    selecting a motion vector predictor for motion prediction of the current unit from the candidate set according to a motion vector competition method.

2. The motion prediction method as claimed in claim 1, wherein the method further comprises:
    predicting a motion vector of the current unit according to the motion vector of the motion vector predictor.

3. The motion prediction method as claimed in claim 1, wherein calculation of the scaling factors comprises:
    calculating the respective temporal distances between the reference frames of the motion vectors and a candidate unit-located frame.

4. The motion prediction method as claimed in claim 1, wherein calculation of the scaling factors comprises:
    calculating the respective temporal distances between the reference frames of the motion vectors of the candidate units and a candidate unit-located frame;
    calculating a target temporal distance between a target searching frame and the current frame; and
    dividing the target temporal distance by each of the respective temporal distances to obtain the scaling factors.

5. The motion prediction method as claimed in claim 4, wherein scaling of the motion vectors of the candidate units comprises:
    respectively multiplying the motion vectors of the candidate units by the scaling factors of the candidate units to obtain the scaled motion vectors of the candidate units.

6. The motion prediction method as claimed in claim 1, wherein the candidate units comprise at least one of a left unit on the left side of the current unit, an upper unit on an upper side of the current unit, an upper-right unit in line with an upper-right direction of the current unit, and an upper-left unit in line with an upper-left direction of the current unit.

7. The motion prediction method as claimed in claim 1, wherein the reference unit related to the collocated unit further comprises at least one internal unit inside of the collocated unit.

8. The motion prediction method as claimed in claim 1, wherein the current unit is a prediction unit.

9. The motion prediction method as claimed in claim 1, wherein at least one of the candidate units is a prediction unit or a prediction unit partition.

10. The motion prediction method as claimed in claim 1, wherein the motion vector predictor is explicitly selected from the candidate set based on prediction information in the bitstream.

11. The motion prediction method as claimed in claim 1, wherein the motion vector competition method comprises selecting the motion vector predictor for motion prediction of the current unit from a candidate set based on rate-distortion optimization.

12. The motion prediction method as claimed in claim 1, wherein ranking the scaled motion vectors is performed based on one or a combination of neighboring information, shape of the current unit, and position of the current unit.

13. The motion prediction method as claimed in claim 1, wherein ranking the scaled motion vectors is based on a selection order.

14. The motion prediction method as claimed in claim 1, wherein a size of the subset of motion vectors is predetermined.

15. The motion prediction method as claimed in claim 14, wherein the size of the subset of motion vectors is 2.

16. The motion prediction method as claimed in claim 1, wherein a size of the subset of motion vectors is 5.

17. The motion prediction method as claimed in claim 1, wherein the subset of motion vectors has an adaptive size.

18. A video coding device, comprising:
    a processing circuit configured to:
        determine a plurality of candidate units corresponding to a current unit of a current frame, wherein the candidate units comprise at least a neighboring unit of the current unit and at least a reference unit related to a collocated unit of the current unit, wherein the reference unit related to the collocated unit comprises a unit in line with a down-right direction of the collocated unit;
        obtain a plurality of motion vectors of the candidate units;
        calculate a plurality of scaling factors of the candidate units according to a plurality of respective temporal distances depending on a plurality of reference frames of the motion vectors;
        scale the motion vectors of the candidate units according to the scaling factors to obtain a plurality of scaled motion vectors;
        rank the scaled motion vectors;

identify a subset of highest ranking motion vectors among the plurality of scaled motion vectors to be included in a candidate set;

select a motion vector predictor for motion prediction of the current unit from the candidate set according to a motion vector competition method; and encode or decode a video based on the selected motion vector predictor.

19. The video coding device as claimed in claim 18, wherein the processing circuit, when calculating the plurality of scaling factors, is further configured to:

calculate the respective temporal distances between the reference frames of the motion vectors of the candidate units and a candidate unit-located frame;

calculate a target temporal distance between a target searching frame and the current frame; and divide the target temporal distance by each of the respective temporal distances to obtain the scaling factors.

20. The video coding device as claimed in claim 18, wherein the processing circuit is configured to rank the scaled motion vectors based on one or a combination of neighboring information, shape of the current unit, and position of the current unit.

* * * * *